United States Patent
Balakrishnan et al.

(10) Patent No.: US 9,820,230 B2
(45) Date of Patent: Nov. 14, 2017

(54) LOW POWER PACKET DETECTION CIRCUIT FOR WLAN RECIEVERS

(71) Applicant: Texas Instruments Incorporated, Dallas, TX (US)

(72) Inventors: Jaiganesh Balakrishnan, Bangalore (IN); Sarma Sundareswara Gunturi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 90 days.

(21) Appl. No.: 14/852,234

(22) Filed: Sep. 11, 2015

(65) Prior Publication Data

US 2017/0078970 A1    Mar. 16, 2017

(51) Int. Cl.
  *H04L 5/12*     (2006.01)
  *H04W 52/02*    (2009.01)
  *H04B 1/16*     (2006.01)
  *H04L 27/26*    (2006.01)
  *H04W 84/12*    (2009.01)

(52) U.S. Cl.
  CPC .......... *H04W 52/0232* (2013.01); *H04B 1/16* (2013.01); *H04L 27/2656* (2013.01); *H04W 52/0229* (2013.01); *H04L 27/2663* (2013.01); *H04W 84/12* (2013.01); *Y02B 60/50* (2013.01)

(58) Field of Classification Search
  CPC . H04W 52/0232; H04W 24/08; H04W 84/12; H04W 52/0229; H04L 27/2273; H04L 27/2656; H04B 12/006; H04B 1/16
  USPC .......................................................... 370/215
  See application file for complete search history.

(56) References Cited

U.S. PATENT DOCUMENTS

| | | | |
|---|---|---|---|
| 2003/0112743 A1* | 6/2003 | You ...................... | H04L 27/2663 370/203 |
| 2004/0012441 A1* | 1/2004 | Mackey ................. | H03G 1/007 330/129 |
| 2006/0104253 A1* | 5/2006 | Douglas ................ | H04W 24/02 370/338 |
| 2010/0003927 A1* | 1/2010 | Chou ..................... | G09G 5/006 455/68 |
| 2010/0128820 A1* | 5/2010 | Ko ....................... | H04L 27/2273 375/330 |

* cited by examiner

*Primary Examiner* — Sai-Ming Chan
(74) *Attorney, Agent, or Firm* — John R. Pessetto; Charles A. Brill; Frank D. Cimino (57) ABSTRACT

The disclosure provides a low power receiver. The receiver includes a first channel that receives an RF signal and generates an input signal. The receiver also includes a second channel and a packet detection circuit. The packet detection circuit is coupled to the first channel and the second channel. The packet detection circuit detects a valid packet in the input signal, and activates the second channel on detection of the valid packet.

7 Claims, 6 Drawing Sheets

LOW POWER PACKET DETECTION CIRCUIT FOR WLAN RECIEVERS

TECHNICAL FIELD

The present disclosure relates generally to Wireless Local Area Network (WLAN) transceiver system, and more particularly to a packet detection circuit for use in a WLAN receivers.

BACKGROUND

Wireless Local Area Network (WLAN) is a basic service set in which two or more stations communicate directly with each other, e.g. by radio frequency signals. In a more common configuration, one or more "access points" are set up at predetermined locations and, each access point also has a wireless radio capability to permit wireless communications with nearby wireless-enabled devices such as desktop computers, notebooks, handheld devices, and the like. Each access point has a certain range and a wireless-enabled device must be within that range for effective communication to occur.

Most of the devices coupling to a wireless network are portable devices such as notebook computers, personal digital assistants (PDAs), and the like. These portable devices include a WLAN transceiver for communication. In addition, such portable devices are usually battery-powered. A WLAN transceiver includes a transmitter and a WLAN receiver. Power consumption is a key care about for WLAN receivers integrated on the portable devices.

The time between battery recharges of a portable device has a major impact on a user's experience. A WLAN or IEEE 802.11 standard compatible receivers spend a large proportion of power in listen mode. In listen mode, the WLAN receiver functions to determine presence of a data packet. This results in significant battery power consumption by the WLAN receiver, thus reducing battery life.

SUMMARY

According to an aspect of the disclosure, a receiver is disclosed. The receiver includes a first channel that receives an RF signal and generates an input signal. The receiver also includes a second channel and a packet detection circuit. The packet detection circuit is coupled to the first channel and the second channel. The packet detection circuit detects a valid packet in the input signal, and activates the second channel on detection of the valid packet.

DETAILED DESCRIPTION OF THE EMBODIMENTS

Figure 1:
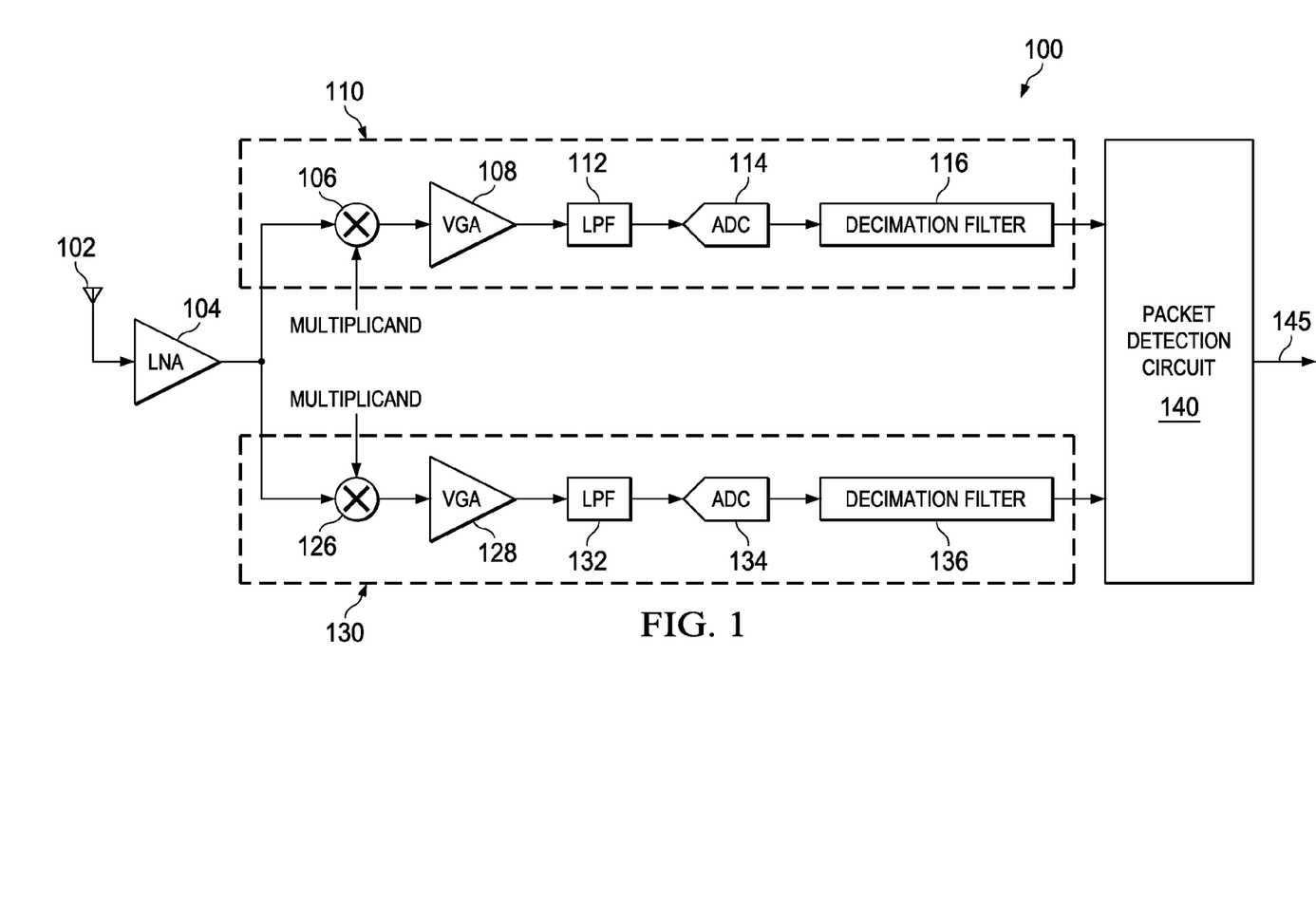
FIG. 1 is a block diagram illustrating an example receiver in which several aspects of the present invention can be implemented.

FIG. 1 is a block diagram illustrating an example receiver 100 in which several aspects of the present invention can be implemented. In one example, the receiver 100 is an IEEE 802.11 WLAN receiver. The receiver 100 includes an antenna 102, a low noise amplifier (LNA) 104, a first channel 110, a second channel 130, and a packet detection circuit 140. The LNA 104 is coupled to the antenna 102. The first channel 110 and the second channel 130 are coupled to the LNA 104.

The first channel 110 includes a mixer 106. A variable gain amplifier (VGA) 108 is coupled to the mixer 106. The mixer 106 also receives a multiplicand. A low pass filter (LPF) 112 is coupled to the VGA 108. An analog to digital converter (ADC) 114 is coupled to the LPF 112. A decimation filter 116 coupled to the ADC 114.

Similar, to the first channel 110, the second channel 130 includes a mixer 126. A variable gain amplifier (VGA) 128 is coupled to the mixer 126. The mixer 126 also receives a multiplicand. A low pass filter (LPF) 132 is coupled to the VGA 128. An analog to digital converter (ADC) 134 is coupled to the LPF 132. A decimation filter 136 coupled to the ADC 134.

The packet detection circuit 140 is coupled to the decimation filter 116, and the decimation filter 136. The packet detection circuit 140 generates an output signal 145. The receiver 100 may include one or more additional components known to those skilled in the relevant art and are not discussed here for simplicity of the description.

The operation of the receiver 100 illustrated in FIG. 1 is explained now. The antenna 102 receives an RF (radio frequency) signal. In one version, the RF signal is an IEEE 802.11 standard compatible. When the first channel 110 is an in-phase channel, the second channel 130 is a quadrature-phase channel, and when the first channel 110 is the quadrature-phase channel, the second channel 130 is the in-phase channel.

The multiplicand received in the in-phase channel is cos(2 πft), where f is a frequency of a carrier wave used by a transmitter for transmitting the RF signal. The multiplicand received in the quadrature-phase channel is sin(2 πft). The LNA 104 amplifies the RF signal. The LNA 104 is a low noise amplifier, and provides a gain in a range of 15 dB to 25 dB. The RF signal is now processed through the first channel 110 and the second channel 130. For brevity of the description, the processing of the RF signal through the first channel 110 is explained now. It is understood that the processing of the RF signal in the first channel 110 and the second channel 130 is similar.

The RF signal is mixed with the multiplicand in the mixer 106 to generate a mixed signal. The VGA 108 amplifies the mixed signal. The LPF 112 allows only desired frequency of the mixed signal received from the VGA 108 to pass through while rejecting all other unwanted channel frequencies. The LPF 112 generates a filtered signal. The ADC 114 generates a digital signal from the filtered signal received from the LPF 112.

The decimation filter 116 is used for filtering the digital signal. The first channel 110, and the second channel 130 generates an in-phase signal and a quadrature-phase signal. In one version, when the first channel 110 is the in-phase channel, the first channel 110 processes the RF signal to generate the in-phase signal, and the second channel 130 processes the RF signal to generate the quadrature-phase signal.

In another version, when the first channel 110 is the quadrature-phase channel, the first channel 110 processes the RF signal to generate the quadrature-phase signal, and the second channel 130 processes the RF signal to generate the in-phase signal. Both the in-phase signal and the quadrature-phase signal include a plurality of valid packets. Each valid packet of the plurality of valid packets includes a short training frame of a first time period. The short training frame includes a plurality of short symbols at a plurality of time instants.

The packet detection circuit 140 processes the in-phase signal and the quadrature-phase signal to generate the output signal 145. The output signal 145 indicates if a valid packet is detected by the packet detection circuit 140.

Figure 2A:
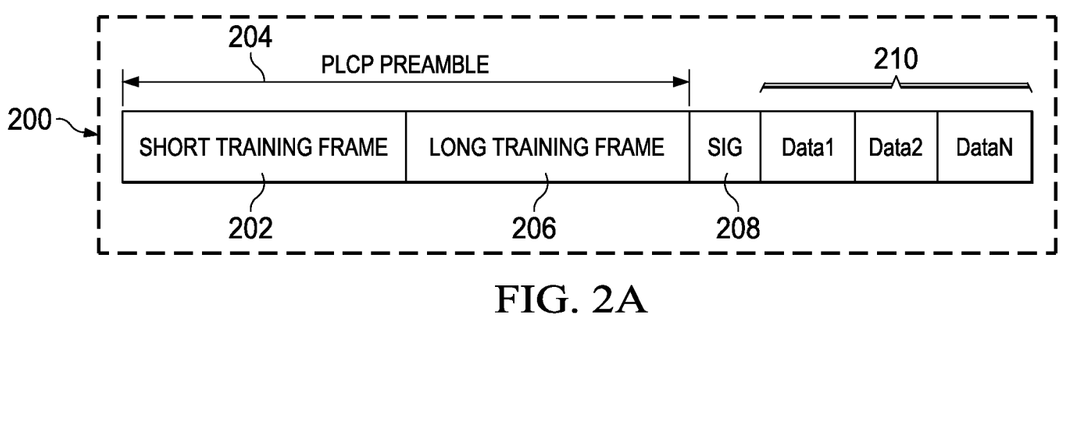
FIG. 2(A) is a format diagram illustrating a valid packet, according to an embodiment.

FIG. 2(A) is a format diagram illustrating a valid packet 200, according to an embodiment. In one example, the valid packet 200 conforms to the IEEE 802.11a/g/n standard. The valid packet 200 includes a short training frame 202, a long training frame 206, a signal field (SIG) 208 and a data field 210. The short training frame 202 and the long training frame 206 are part of a physical layer convergence procedure (PLCP) preamble 204.

The PLCP preamble 204 is followed by the signal field data SIG 208. The data field 210 follows the signal field data SIG 208. The data field 210 includes a plurality of sub-data packets illustrated as Data1, Data2 and DataN. The PLCP preamble 204 is used for synchronization. In one example, the short training frame 202 includes multiple short symbols, and the long training frame 206 includes multiple long symbols.

Figure 2B:
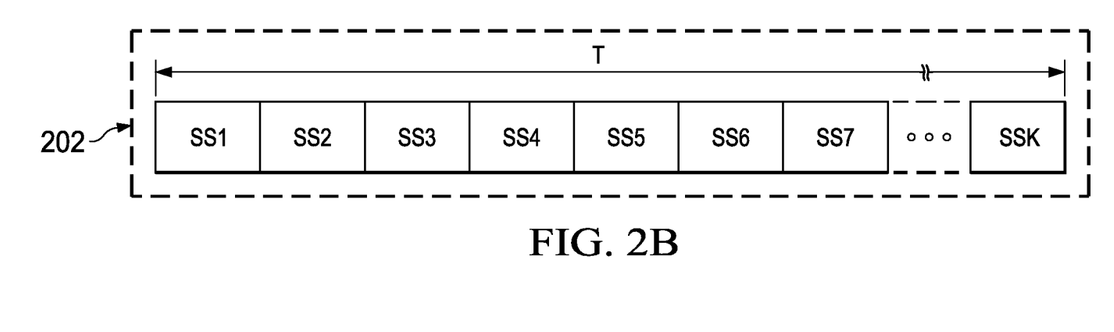
FIG. 2(B) is a format diagram illustrating a short training frame, according to an embodiment.

FIG. 2(B) is a format diagram illustrating the short training frame 202, according to an embodiment. The short training frame 202 is of a first time period T. The short training frame 202 includes a plurality of short symbols at a plurality of time instants. The plurality of short symbols is illustrated as SS1, SS2 to SSK.

Figure 3:
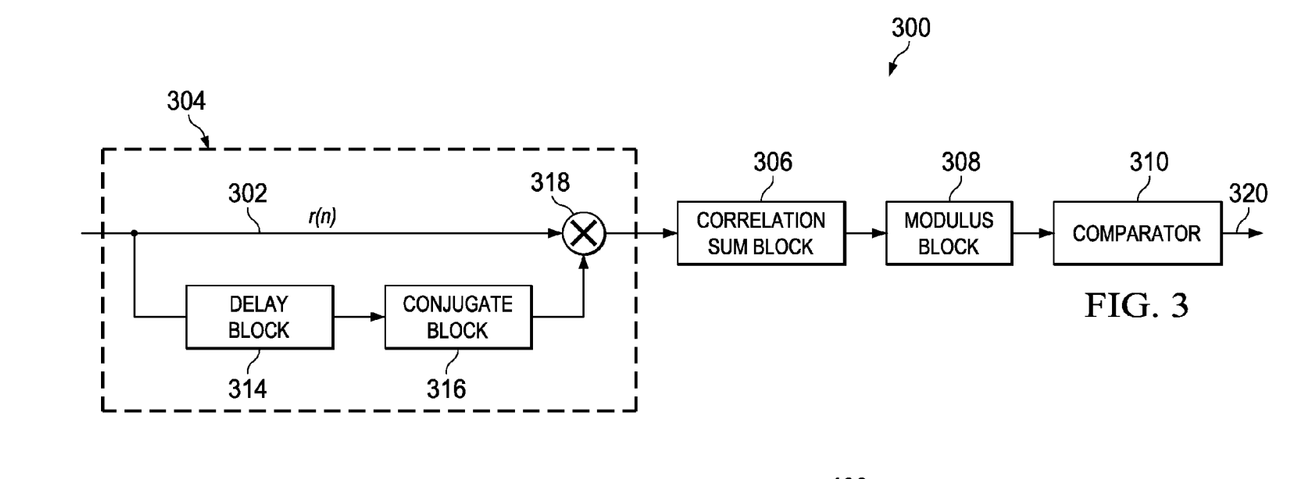
FIG. 3 illustrates a packet detection circuit.

FIG. 3 illustrates a packet detection circuit 300. The packet detection circuit 300 includes a delayed correlation block 304, a correlation sum block 306, a modulus block 308 and a comparator 310. The delayed correlation block 304 receives an input signal r(n) 302. The delayed correlation block 304 includes a delay block 314, a conjugate block 316 and a multiplier 318.

The correlation sum block 306 is coupled to the delayed correlation block 304. The modulus block 308 is coupled to the correlation sum block 306, and the comparator 310 is coupled to the modulus block 308.

The operation of the packet detection circuit illustrated in FIG. 3 is explained now. The delayed correlation block 304 receives the input signal r(n) 302. The input signal r(n) 302, in one version, includes a plurality of valid packets similar to the valid packet 200 illustrated in FIG. 2(A). The delayed correlation block 304 detects presence of short symbols and thereby presence of a valid packet. In one example, the delayed correlation block 304 detects the presence of a valid packet by comparing the input signal r(n) 302 with a delayed version of itself, wherein the delay corresponds to a duration corresponding to that of one or more short symbols.

Typically, if during the short symbol portion of the valid packet, the correlation results in a large magnitude, and during other portions of the packet or if there is no packet, the correlation results in a small magnitude. The delay block 314 delays the short symbols received in the input signal r(n) 302 to generate delayed samples. The conjugate block 316 generates conjugate values of the delayed samples received from the delay block 314. The conjugate values of the delayed samples are multiplied with the short symbols in the input signal r(n) 302 by the multiplier 318. The signals generated by the multiplier 318 are summed in the correlation sum block 306 to generate a partial correlation output. The partial correlation output undergoes a square magnitude operation in the modulus block 308 to generate a detection signal.

The comparator 310 generates an output signal 320 when the detection signal is greater than a threshold. The output signal 320 indicates presence of a valid packet. The packet detection circuit 300 utilizes the repetitive transmission of the short symbols in the valid packet. However, the packet detection circuit 300 requires both the in-phase signal and the quadrature-phase signal for packet detection and packet reception.

The packet detection circuit 300 fails to detect the packet when only one of the in-phase signal or quadrature-phase signal is received. This is because of a frequency offset between a transmitter and a receiver. The receiver includes the packet detection circuit 300. The frequency offset causes a rotation in the short symbols of a valid packet, and this hampers the repetitive symmetry of the short symbols when only one of the in-phase signal or quadrature-phase signal is processed.

Therefore, in the packet detection circuit 300, both the in-phase channel and the quadrature-phase channel are active during the listen mode. This degrades the power performance rating of a receiver using the packet detection circuit 300.

Figure 4:
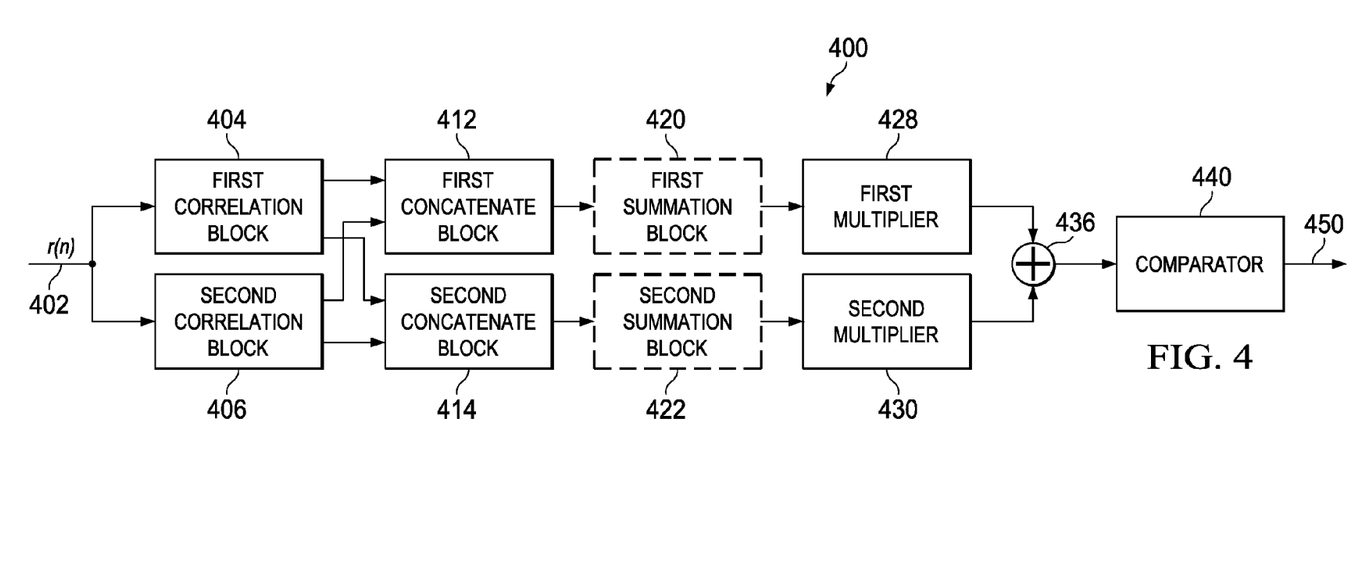
FIG. 4 illustrates a packet detection circuit, according to an embodiment.

FIG. 4 illustrates a packet detection circuit 400, according to an embodiment. The packet detection circuit 400 is similar to the packet detection circuit 140, illustrated in FIG. 1, in connection. The packet detection circuit 400 includes a first correlation block 404 and a second correlation block 406 that receive an input signal r(n) 402. A first concatenate block 412 is coupled to the first correlation block 404 and the second correlation block 406. A second concatenate block 414 is coupled to the second correlation block 406 and the first correlation block 404.

A first summation block 420 is coupled to the first concatenate block 412, and a second summation block 422 is coupled to the second concatenate block 414. A first multiplier 428 is coupled to the first summation block 420, and a second multiplier 430 is coupled to the second summation block 422. A summation block 436 is coupled to the first multiplier 428 and the second multiplier 430.

A comparator 440 is coupled to the summation block 436. The comparator 440 generates an output signal 450. The packet detection circuit 400 may include one or more additional components known to those skilled in the relevant art and are not discussed here for simplicity of the description.

The operation of the packet detection circuit 400 illustrated in FIG. 4 is explained now. The operation of the packet detection circuit 400 is explained in connection with the receiver 100, illustrated in FIG. 1. When the first channel 110 is an in-phase channel, the second channel 130 is a quadrature-phase channel, and when the first channel 110 is the quadrature-phase channel, the second channel 130 is the in-phase channel.

The first channel 110 in the receiver 100 receives an RF signal, and generates the input signal r(n) 402. In one example, during listen mode, only one of the first channel 110 and the second channel 130 is active. When the first channel 110 is the in-phase channel, the first channel 110 processes the RF signal to generate the in-phase signal, and when the first channel 110 is the quadrature-phase channel, the first channel 110 processes the RF signal to generate a quadrature-phase signal.

The input signal r(n) 402 is one of an in-phase signal and a quadrature-phase signal. The input signal r(n) 402, in one version, includes a plurality of valid packets similar to the valid packet 200 illustrated in FIG. 2(A). Thus, each valid packet of the plurality of valid packets includes a short training frame of a first time period, wherein the short training frame includes a plurality of short symbols at a plurality of time instants.

The packet detection circuit is coupled to the first channel 110 and the second channel 130. The packet detection circuit 400 detects a valid packet from one of the in-phase signal and the quadrature-phase signal. The receiver 100 stores a high-phase short symbol s1(k) and a low-phase short symbol s2(k) (illustrated later in the description in connection with FIG. 6). The input signal r(n) 402 is received in the packet detection circuit 400.

The first correlation block 404 correlates the input signal r(n) 402 and the high-phase short symbol s1(k) to generate a first correlated data. The second correlation block 406 correlates the input signal r(n) 402 and the low-phase short symbol s2(k) to generate a second correlated data. The first concatenate block 412 adds the first correlated data and a delayed version of the second correlated data to generate an in-phase correlation component. The second concatenate block 414 adds the second correlated data and a delayed version of the first correlated data to generate a quadrature-phase correlation component.

The first summation block 420 averages the in-phase correlation components received at the plurality of time instants to generate a first average signal. In one example, the first summation block 420 averages the in-phase correlation components at P repetitions of the short symbols in a packet to generate the first average signal. The second summation block 422 averages the quadrature-phase correlation components received at the plurality of time instants to generate a second average signal. In one example, the second summation block 422 averages the quadrature-phase correlation components at P repetitions of the short symbols in a packet to generate the second average signal.

The first multiplier 428 squares the first average signal to generate a first power signal, and the second multiplier 430 squares the second average signal to generate a second power signal. The square of the first average signal is multiplication of the first average signal with the first average signal, and the square of the second average signal is multiplication of the second average signal with the second average signal.

The summation block 436 sums the first power signal and the second power signal to generate a channel power signal. The comparator 440 compares the channel power signal with a threshold. When the channel power signal is greater than the threshold, the comparator 440 generates the output signal 450 to indicate detection of the valid packet.

On detection of the valid packet, the packet detection circuit 400 activates the second channel 130. Thus, in the receiver 100, only one channel is active during the listen mode, and the other channel is activated on detection of the valid packet. This provides a power margin improvement in a WLAN receiver using the packet detection circuit 400.

The packet detection circuit 400 provides a low power listen mode for a zero-IF 802.11a/g/n receiver in which the quadrature-phase channel is inactivated. In another version, the packet detection circuit 400 provides a low power listen mode for a receiver in which the in-phase channel is inactivated.

In one example, the packet detection circuit 400 detects the valid packet by performing correlation of the input signal r(n) 402 with the high-phase short symbol and the low-phase short symbol. In another example, an in-phase component of a short symbol and a quadrature-phase component of the short symbol are utilized to detect the valid packet. The operation of the packet detection circuit 400 is further illustrated in connection with FIG. 6.

Figure 5:
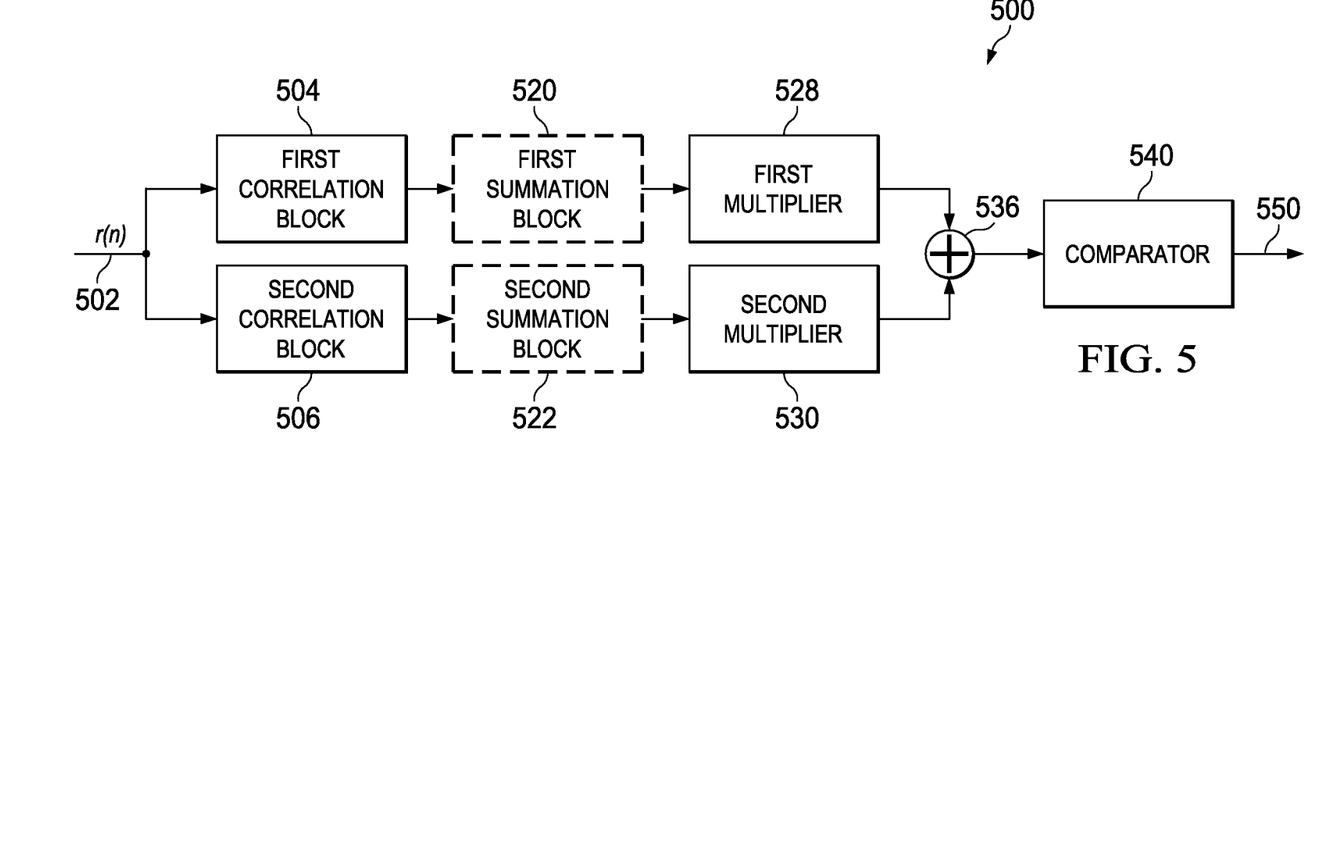
FIG. 5 illustrates a packet detection circuit, according to an embodiment.

FIG. 5 illustrates a packet detection circuit 500, according to an embodiment. The packet detection circuit 500 is similar to the packet detection circuit 140, illustrated in FIG. 1, in connection. The packet detection circuit 500 includes a first correlation block 504 and a second correlation block 506 that receive an input signal r(n) 502.

A first summation block 520 is coupled to the first correlation block 504, and a second summation block 522 is coupled to the second correlation block 506. A first multiplier 528 is coupled to the first summation block 520, and a second multiplier 530 is coupled to the second summation block 522. A summation block 536 is coupled to the first multiplier 528 and the second multiplier 530.

A comparator 540 is coupled to the summation block 536. The comparator 540 generates an output signal 550. The packet detection circuit 500 may include one or more additional components known to those skilled in the relevant art and are not discussed here for simplicity of the description.

The operation of the packet detection circuit 500 illustrated in FIG. 5 is explained now. The operation of the packet detection circuit 500 is explained in connection with the receiver 100, illustrated in FIG. 1. When the first channel 110 is an in-phase channel, the second channel 130 is a quadrature-phase channel, and when the first channel 110 is the quadrature-phase channel, the second channel 130 is the in-phase channel.

The first channel 110 in the receiver 100 receives an RF signal, and generates the input signal r(n) 502. In one example, during listen mode, only one of the first channel 110 and the second channel 130 is active. When the first channel 110 is the in-phase channel, the first channel 110 processes the RF signal to generate the in-phase signal, and when the first channel 110 is the quadrature-phase channel, the first channel 110 processes the RF signal to generate a quadrature-phase signal.

The input signal r(n) 502 is one of an in-phase signal and a quadrature-phase signal. The input signal r(n) 502, in one version, includes a plurality of valid packets similar to the valid packet 200 illustrated in FIG. 2(A). Thus, each valid packet of the plurality of valid packets includes a short training frame of a first time period, wherein the short training frame includes a plurality of short symbols at a plurality of time instants.

The packet detection circuit is coupled to the first channel 110 and the second channel 130. The packet detection circuit 500 detects a valid packet from one of the in-phase signal and the quadrature-phase signal. The receiver 100 stores an in-phase component $s_I(k)$ of a short symbol and a quadrature-phase component $s_Q(k)$ of the short symbol (illustrated later in the description in connection with FIG. 6). The input signal r(n) 502 is received in the packet detection circuit 500.

The first correlation block 504 correlates the input signal r(n) 502 and the in-phase component $s_I(k)$ of the short symbol to generate an in-phase correlation component. The second correlation block 506 correlates the input signal r(n) 502 and the quadrature-phase component $s_Q(k)$ of the short symbol to generate a quadrature-phase correlation component.

The first summation block 520 averages the in-phase correlation components received at the plurality of time instants to generate a first average signal. In one example, the first summation block 520 averages the in-phase correlation components at P repetitions of the short symbols in a packet to generate the first average signal. The second summation block 522 averages the quadrature-phase correlation components received at the plurality of time instants to generate a second average signal. In one example, the second summation block 522 averages the quadrature-phase correlation components at P repetitions of the short symbols in a packet to generate the second average signal.

The first multiplier 528 squares the first average signal to generate a first power signal, and the second multiplier 530 squares the second average signal to generate a second power signal. The square of the first average signal is multiplication of the first average signal with the first average signal, and the square of the second average signal is multiplication of the second average signal with the second average signal.

The summation block 536 sums the first power signal and the second power signal to generate a channel power signal. The comparator 540 compares the channel power signal with a threshold. When the channel power signal is greater than the threshold, the comparator 540 generates the output signal 550 to indicate detection of the valid packet.

On detection of the valid packet, the packet detection circuit 500 activates the second channel 130. Thus, in the receiver 100, only one channel is active during the listen mode, and the other channel is activated on detection of the valid packet. This provides a huge power margin improvement in a WLAN receiver using the packet detection circuit 500.

The packet detection circuit 500 provides a low power listen mode for a zero-IF 802.11a/g/n receiver in which the quadrature-phase channel is inactivated. In another version, the packet detection circuit 500 provides a low power listen mode for a receiver in which the in-phase channel is inactivated. The operation of the packet detection circuit 500 is further illustrated in connection with FIG. 6.

Figure 6:
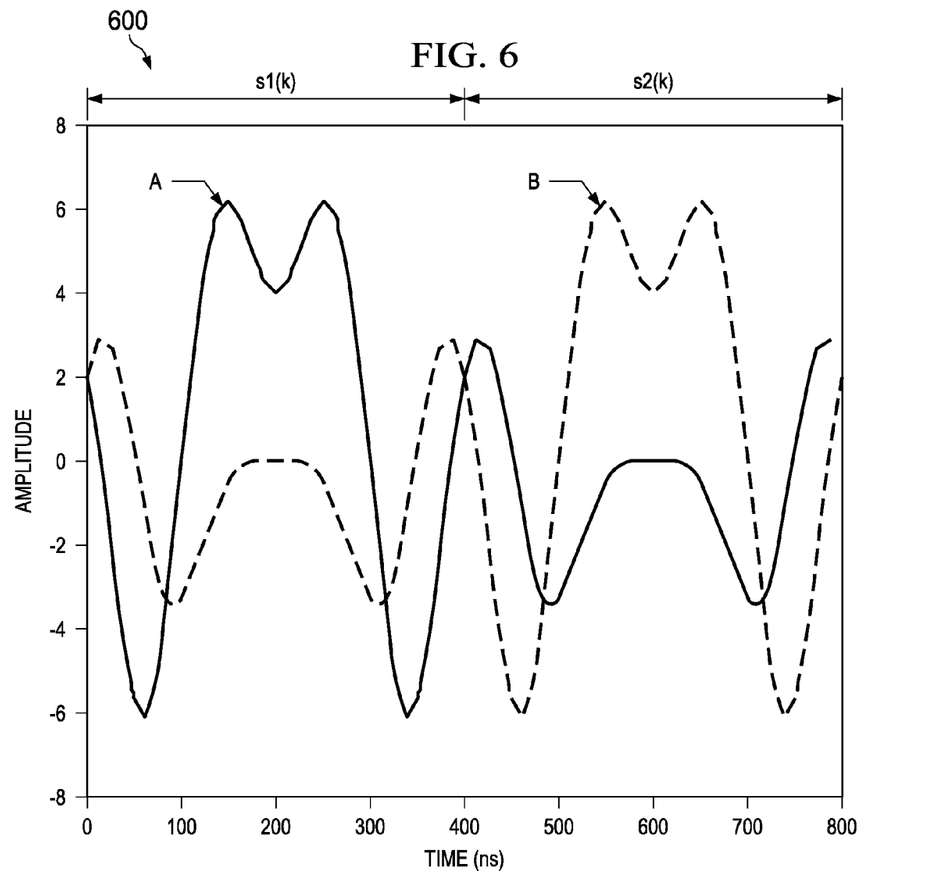
FIG. 6 is a waveform of a short symbol, according to an embodiment.

FIG. 6 is a waveform 600 of a short symbol, according to an embodiment. The waveform includes graph A and B. The graph A represents an in-phase component $s_I(k)$, and the graph B represents a quadrature-phase component $s_Q(k)$ of the short symbol. The quadrature-phase component (graph B) is cyclically shifted version of the in-phase component (graph A).

The graph A includes two parts; high-phase short symbol illustrated as s1(k) and low-phase short symbol illustrated as s2(k). The high-phase short symbol s1(k) extends from 0 to 400 ns, and the low-phase short symbol s2(k) extends from 400 ns to 800 ns. The high-phase short symbol s1(k) and the low-phase short symbol s2(k) are stored in the receiver, for example receiver 100.

The operation of the packet detection circuit 400 is now further illustrated in connection with waveform 600 of the short symbol.

The input signal r(n) 402 is received in the packet detection circuit 400. The first correlation block 404 correlates the input signal r(n) 402 and the high-phase short symbol s1(k) to generate a first correlated data z1(n). The second correlation block 406 correlates the input signal r(n) 402 and the low-phase short symbol s2(k) to generate a second correlated data z2(n).

$$z1(n) = \sum_{k=0}^{N-1} r(n-k) * s1(k) \quad (1)$$

$$z2(n) = \sum_{k=0}^{N-1} r(n-k) * s2(k) \quad (2)$$

The correlation is performed over a time window of N samples. In one example, N is equal to 400 ns. The first concatenate block 412 adds the first correlated data z1(n) and a delayed version of the second correlated data z2(n) to generate an in-phase correlation component y1(n). The second concatenate block 414 adds the second correlated data z2(n) and a delayed version of the first correlated data z1(n) to generate a quadrature-phase correlation component y2(n).

$$y1(n) = \quad (3)$$
$$z1(n) + z2(n-N) = \sum_{k=0}^{N-1} r(n-k) * s1(k) + \sum_{k=0}^{N-1} r(n-N-k) * s2(k)$$

$$y2(n) = \quad (4)$$
$$z2(n) + z1(n-N) = \sum_{k=0}^{N-1} r(n-k) * s2(k) + \sum_{k=0}^{N-1} r(n-N-k) * s1(k)$$

Thus, by using the fact that the quadrature-phase component is cyclically shifted version of the in-phase component, y1(n) and y2(n) are obtained, wherein y1(n) and y2(n) are proportional to the in-phase and quadrature channel impulse response coefficients, respectively. In one version, the first correlation block correlates the input signal r(n) and the in-phase component of the short symbol to generate an in-phase correlation component, and the second correlation block correlates the input signal r(n) and the quadrature-phase component of the short symbol to generate a quadrature-phase correlation component.

The short symbols are periodic with time interval of 800 ns and hence the in-phase correlation component y1(n), and quadrature-phase correlation component y2(n), are also periodic with time interval of $N_1$=800 ns. Typically, the in-phase correlation component y1(n), and quadrature-phase correlation component y2(n), are corrupted by noise in a receiver. To mitigate the impact of noise in the in-phase correlation component y1(n), and in the quadrature-phase correlation component, y2(n), the correlation samples separated by 800 ns time intervals are averaged to generate a first average signal and a second average signal respectively. The first summation block 420 averages the in-phase correlation components (y1(n)) received at a plurality of time instants to generate the first average signal. In one example, the first summation block 420 averages the in-phase correlation components y1(n) at P repetitions of the short symbols in a packet to generate the first average signal.

$$\overline{y1}(n)=\Sigma_{p=0}^{P-1}y1(n-pN_1) \quad (5)$$

Similarly, the second summation block 422 sums the quadrature-phase correlation components (y2(n)) received at a plurality of time instants to generate a second average signal. In one example, the second summation block 422 averages the quadrature-phase correlation components y2(n) at P repetitions of the short symbols in a packet to generate the second average signal.

$$\overline{y2}(n)=\Sigma_{p=0}^{P-1}y2(n-pN_1) \quad (6)$$

The first multiplier 428 squares the first average signal to generate a first power signal, and the second multiplier 430 squares the second average signal to generate a second power signal. The summation block 436 sums the first power signal and the second power signal to generate a channel power signal $\overline{CP}(n)$. In one version, the first power signal and the second power signal are summed over a window of duration of L samples, where L is a length of the channel. This is equivalent to measuring the channel power signal $\overline{CP}(n)$ over an L sample span. A valid packet is detected if the channel power signal $\overline{CP}(n)$ is greater than a threshold.

$$\overline{CP}(n)=\Sigma_{l=0}^{L-1}(\overline{y1}(n-l))^2+(\overline{y2}(n-l))^2 \quad (7)$$

On detection of the valid packet, the packet detection circuit 400 activates the second channel. Thus, in the packet detection circuit 400, only one channel is active during the listen mode, and the other channel is activated on detection of the valid packet. This provides a huge power margin improvement in a WLAN receiver using the packet detection circuit 400.

The operation of the packet detection circuit 500 is now further illustrated in connection with waveform 600 of the short symbol.

The input signal r(n) 502 is received in the packet detection circuit 500. The first correlation block 504 correlates the input signal r(n) 502 and the in-phase component $s_I(k)$ of the short symbol to generate an in-phase correlation component $z_I(n)$. The second correlation block 506 correlates the input signal r(n) 502 and the quadrature-phase component $s_Q(k)$ of the short symbol to generate a quadrature-phase correlation component $z_Q(n)$.

$$z_I(n) = \sum_{k=0}^{N_1-1} r(n-k)*s_I(k) \quad (8)$$

$$z_Q(n) = \sum_{k=0}^{N_1-1} r(n-k)*s_Q(k) \quad (9)$$

The correlation is performed over a time window of $N_1$ samples. In one example, N is equal to 800 ns. The short symbols are periodic with time interval of 800ns and hence the in-phase correlation component $z_I(n)$ and quadrature-phase correlation component $z_Q(n)$, are also periodic with time interval of $N_1$=800 ns. Typically, the in-phase correlation component $z_I(n)$, and quadrature-phase correlation component $z_Q(n)$, are corrupted by noise in a receiver. To mitigate the impact of noise in the in-phase correlation component $z_I(n)$, and in the quadrature-phase correlation component, $z_Q(n)$, the correlation samples separated by 800 ns time intervals are averaged to generate a first average signal and a second average signal respectively. The first summation block 520 averages the in-phase correlation components $z_I(n)$ received at a plurality of time instants to generate the first average signal. In one example, the first summation block 520 averages the in-phase correlation components $z_I(n)$ at P repetitions of the short symbols in a packet to generate the first average signal.

$$\overline{z_I}(n)=\Sigma_{p=0}^{P-1}z_I(n-pN_1) \quad (10)$$

Similarly, the second summation block 522 averages the quadrature-phase correlation components $z_Q(n)$ received at a plurality of time instants to generate a second average signal. In one example, the second summation block 522 averages the quadrature-phase correlation components $z_Q(n)$ at P repetitions of the short symbols in a packet to generate the second average signal.

$$\overline{z_Q}(n)=\Sigma_{p=0}^{P-1}z_Q(n-pN_1) \quad (11)$$

The first multiplier 528 squares the first average signal to generate a first power signal, and the second multiplier 530 squares the second average signal to generate a second power signal. The summation block 536 sums the first power signal and the second power signal to generate a channel power signal $\overline{CP}(n)$. In one version, the first power signal and the second power signal are summed over a window of duration of L samples, where L is a length of the channel. This is equivalent to measuring the channel power signal $\overline{CP}(n)$ over an L sample span. A valid packet is detected if the channel power signal $\overline{CP}(n)$ is greater than a threshold.

$$\overline{CP}(n)=\Sigma_{l=0}^{L-1}(\overline{z_I}(n-l))^2+(\overline{z_Q}(n-l))^2 \quad (12)$$

On detection of the valid packet, the packet detection circuit 500 activates the second channel. Thus, in the packet detection circuit 500, only one channel is active during the listen mode, and the other channel is activated on detection of the valid packet. This provides a huge power margin improvement in a WLAN receiver using the packet detection circuit 500.

Figure 7:
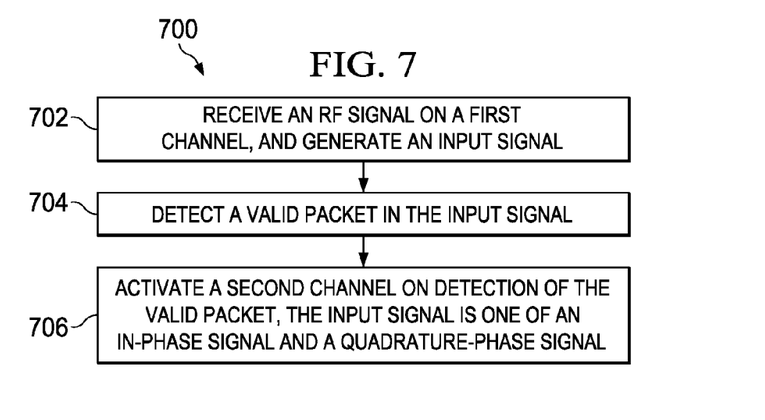
FIG. 7 is a flowchart to illustrate a method of operation of a packet detection circuit, according to an embodiment.

FIG. 7 is a flowchart 700 to illustrate a method of operation of a packet detection circuit, according to an embodiment. The flowchart 700 is explained in connection with the receiver 100 illustrated in FIG. 1, and the packet detection circuit 400 illustrated in FIG. 4. At step 702, an RF signal is received on a first channel and an input signal is generated. In receiver 100, illustrated in FIG. 1, the first channel 110 in the receiver 100 receives an RF signal, and generates the input signal r(n) 402. The input signal r(n) 402 is one of an in-phase signal and a quadrature-phase signal. When the first channel 110 is an in-phase channel, the second channel 130 is a quadrature-phase channel, and when the first channel 110 is the quadrature-phase channel, the second channel 130 is the in-phase channel.

At step 704, a valid packet is detected in the input signal. The input signal r(n) 402, in one version, includes a plurality of valid packets. Each valid packet of the plurality of valid packets includes a short training frame of a first time period, wherein the short training frame includes a plurality of short symbols at a plurality of time instants. The valid packet is detected from one of the in-phase signal and the quadrature-phase signal.

At step 706, the second channel is activated on detection of the valid packet. Thus, only one channel is active during the listen mode, and the other channel is activated on detection of the valid packet. This provides a huge power margin improvement in a WLAN receiver using the flowchart 700.

Figure 8:
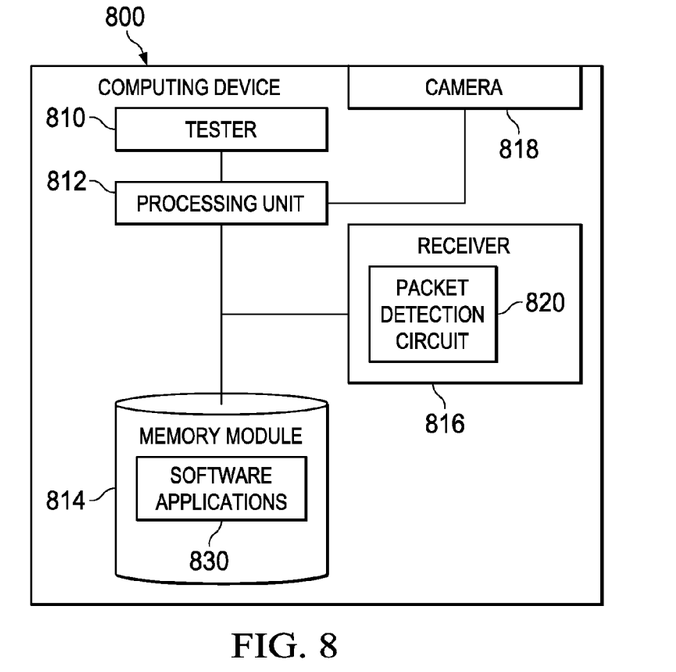
FIG. 8 is a block diagram illustrating a computing device, according to an embodiment.

FIG. 8 is a block diagram illustrating a computing device 800, according to an embodiment. The computing device 800 is, or is incorporated into, a mobile communication device, such as a mobile phone, a personal digital assistant, a transceiver, a personal computer, or any other type of electronic system. The computing device 800 may include one or more additional components known to those skilled in the relevant art and are not discussed here for simplicity of the description.

In some embodiments, the computing device 800 comprises a megacell or a system-on-chip (SoC) which includes a processing unit 812 such as a CPU (Central Processing Unit), a memory module 814 (e.g., random access memory (RAM)) and a tester 810. The processing unit 812 can be, for example, a CISC-type (Complex Instruction Set Computer) CPU, RISC-type CPU (Reduced Instruction Set Computer), or a digital signal processor (DSP).

The memory module 814 (which can be memory such as RAM, flash memory, or disk storage) stores one or more software applications 830 (e.g., embedded applications) that, when executed by the processing unit 812, performs any suitable function associated with the computing device 800. The tester 810 comprises logic that supports testing and debugging of the computing device 800 executing the software applications 830.

For example, the tester 810 can be used to emulate a defective or unavailable component(s) of the computing device 800 to allow verification of how the component(s), were it actually present on the computing device 800, would perform in various situations (e.g., how the component(s) would interact with the software applications 830). In this way, the software applications 830 can be debugged in an environment which resembles post-production operation.

The processing unit 812 typically comprises memory and logic which store information frequently accessed from the memory module 814. A camera 818 is coupled to the processing unit 812. The computing device 800 includes a receiver 816. The receiver 816 is coupled to the processing unit 812 and the memory module 814. The receiver 816 includes a packet detection circuit 820. The packet detection circuit 820 is similar to the packet detection circuit 400 or 500 in connection and operation.

The receiver includes a first channel and a second channel. The first channel in the receiver 816 receives an RF signal, and generates an input signal. The input signal is one of an in-phase signal and a quadrature-phase signal. The packet detection circuit 820 is coupled to the first channel and the second channel.

On detection of the valid packet, the packet detection circuit 820 activates the second channel. Thus, in the receiver 816, only one channel is active during the listen mode, and the other channel is activated on detection of the valid packet. This provides a huge power margin improvement in a WLAN receiver using the packet detection circuit 820.

The packet detection circuit 820 provides a low power listen mode for the receiver 816 in which the quadrature-phase channel is inactivated. In another version, the packet detection circuit 820 provides a low power listen mode for the receiver 816 in which the in-phase channel is inactivated.

Figure 9:
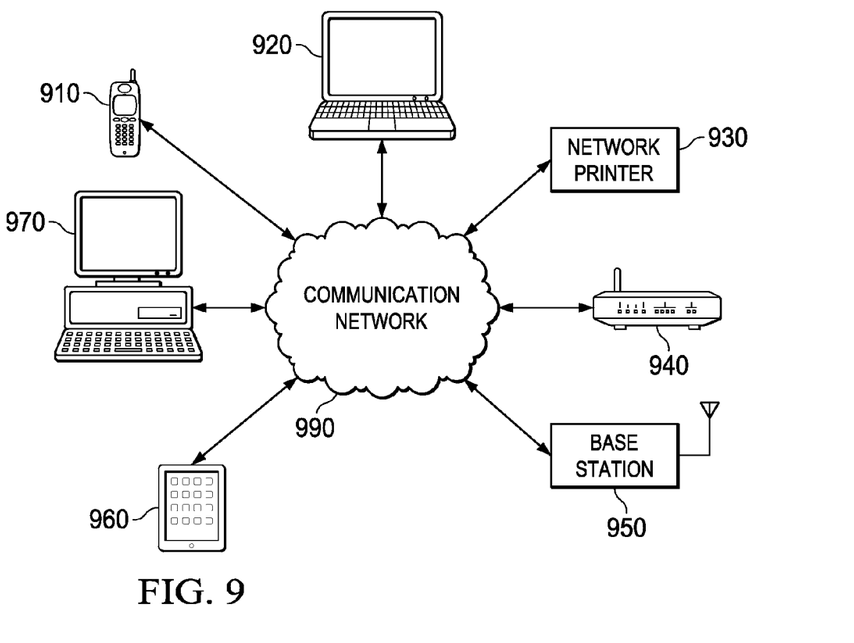
FIG. 9 is an example environment in which various aspects of the present disclosure may be implemented.

FIG. 9 is an example environment in which various aspects of the present disclosure may be implemented. As shown, the environment comprises, for example, one or more mobile devices 910, laptops 920, network printers 930, routers 940, base stations 950, PDAs 960 and computers 970. Other wireless or wired devices may be coupled to a communication network 990. The devices 910-970 are coupled to communication network 990. Communication network 990 supports an exchange of data in accordance with the various wireless/wire line communications standards such as, and not limited to, WLAN, WIFI, Bluetooth, dedicated RF channel, GSM, CDMA, OFDM, satellite communication, cable networking, PSTN, DSL etc. Thus, devices 910-970 transmits and receives signal carrying information by processing signals in accordance with one or more such standards. An example sequence of signal processing that may be performed in the devices 910-970 is described in further detail below.

The systems and devices 910-970 are implemented with one or more functional units that are configured to perform processing, transmitting and/or receiving of signals from communication network 990. When each device in the described environment performs communication with other devices, one or more embodiments described in this disclosure are used.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A receiver comprising:
   a first channel configured to receive an RF signal and configured to generate an input signal;
   a second channel; and
   a packet detection circuit coupled to the first channel and the second channel, and configured to detect a valid packet in the input signal, and wherein the packet detection circuit is configured to activate the second channel on detection of the valid packet;
   wherein the packet detection circuit comprises:
   a first correlation block configured to receive the input signal, and configured to correlate the input signal and the high-phase short symbol to generate a first correlated data;
   a second correlation block configured to receive the input signal, and configured to correlate the input signal and the low-phase short symbol to generate a second correlated data;
   a first concatenate block configured to add the first correlated data and a delayed version of the second correlated data to generate an in-phase correlation component;
   a second concatenate block configured to add the second correlated data and a delayed version of the first correlated data to generate a quadrature-phase correlation component;
   a first summation block configured to average the in-phase correlation components received at the plurality of time instants to generate a first average signal;
   a second summation block configured to average the quadrature-phase correlation components received at the plurality of time instants to generate a second average signal;
   a first multiplier configured to square the first average signal to generate a first power signal;
   a second multiplier configured to square the second average signal to generate a second power signal;
   a summation block configured to sum the first power signal and the second power signal to generate a channel power signal; and a comparator configured to compare the channel power signal with a threshold.

2. The receiver of claim 1, wherein when the channel power signal is greater than the threshold, the comparator generates an output signal to indicate detection of the valid packet.

3. A receiver comprising:
a first channel configured to receive an RF signal and configured to generate an input signal;
a second channel; and
a packet detection circuit coupled to the first channel and the second channel, and configured to detect a valid packet in the input signal, and wherein the packet detection circuit is configured to activate the second channel on detection of the valid packet;
wherein the packet detection circuit comprises:
a first correlation block configured to receive the input signal, and configured to correlate the input signal and the in-phase component of the short symbol to generate an in-phase correlation component;
a second correlation block configured to receive the input signal, and configured to correlate the input signal and the quadrature-phase component of the short symbol to generate a quadrature-phase correlation component;
a first summation block configured to average the in-phase correlation components received at the plurality of time instants to generate a first average signal;
a second summation block configured to average the quadrature-phase correlation components received at the plurality of time instants to generate a second average signal;
a first multiplier configured to square the first average signal to generate a first power signal;
a second multiplier configured to square the second average signal to generate a second power signal;
a summation block configured to sum the first power signal and the second power signal to generate a channel power signal; and
a comparator configured to compare the channel power signal with a threshold.

4. A method comprising:
receiving an RF signal on a first channel, and generating an input signal;
detecting a valid packet in the input signal; and
activating a second channel on detection of the valid packet, wherein the input signal is one of an in-phase signal and a quadrature-phase signal;
wherein detecting the valid packet further comprises:
correlating an input signal and a high-phase short symbol to generate a first correlated data;
correlating the input signal and a low-phase short symbol to generate a second correlated data;
adding the first correlated data and a delayed version of the second correlated data to generate an in-phase correlation component;
adding the second correlated data and a delayed version of the first correlated data to generate a quadrature-phase correlation component;
averaging the in-phase correlation components received at the plurality of time instants to generate a first average signal;
averaging the quadrature-phase correlation components received at the plurality of time instants to generate a second average signal;
squaring the first average signal to generate a first power signal;
squaring the second average signal to generate a second power signal;
summing the first power signal and the second power signal to generate a channel power signal; and
comparing the channel power signal with a threshold.

5. The method of claim 4 further comprising generating an output signal to indicate detection of the valid packet when the channel power signal is greater than the threshold.

6. The method of claim 4, wherein squaring the first average signal further comprises multiplying the first average signal with the first average signal to generate the first power signal, and squaring the second average signal further comprises multiplying the second average signal with the second average signal to generate the second power signal.

7. A computing device comprising:
a processing unit;
a memory module coupled to the processing unit; and
a receiver coupled to the processing unit and the memory module, the receiver comprising:
a first channel configured to receive an input RF signal and configured to generate an input signal;
a second channel; and
a packet detection circuit coupled to the first channel and the second channel, and configured to detect a valid packet in the input signal, and wherein the packet detection circuit is configured to activate the second channel on detection of the valid packet;
wherein the packet detection circuit comprises:
a first correlation block configured to receive the input signal, and configured to correlate the input signal and a high-phase short symbol to generate a first correlated data;
a second correlation block configured to receive the input signal, and configured to correlate the input signal and a low-phase short symbol to generate a second correlated data;
a first concatenate block configured to add the first correlated data and a delayed version of the second correlated data to generate an in-phase correlation component;
a second concatenate block configured to add the second correlated data and a delayed version of the first correlated data to generate a quadrature-phase correlation component;
a first summation block configured to average the in-phase correlation components received at the plurality of time instants to generate a first average signal;
a second summation block configured to average the quadrature-phase correlation components received at the plurality of time instants to generate a second average signal;
a first multiplier configured to square the first average signal to generate a first power signal;
a second multiplier configured to square the second average signal to generate a second power signal;
a summation block configured to sum the first power signal and the second power signal to generate a channel power signal; and
a comparator configured to generate an output signal to indicate detection of the valid packet when the channel power signal is greater than a threshold.

* * * * *